United States Patent
Huang

(10) Patent No.: US 8,792,895 B2
(45) Date of Patent: Jul. 29, 2014

(54) PROCESSING METHOD AND SYSTEM FOR MULTI-CARRIER HANDOVER

(75) Inventor: Yada Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 154 days.

(21) Appl. No.: 13/259,716

(22) PCT Filed: Oct. 9, 2010

(86) PCT No.: PCT/CN2010/077628
§ 371 (c)(1),
(2), (4) Date: Dec. 29, 2011

(87) PCT Pub. No.: WO2011/134239
PCT Pub. Date: Nov. 3, 2011

(65) Prior Publication Data
US 2012/0302245 A1    Nov. 29, 2012

(30) Foreign Application Priority Data

Apr. 30, 2010    (CN) .......................... 2010 1 0174858

(51) Int. Cl.
*H04W 36/00*    (2009.01)
*H04W 92/20*    (2009.01)
(52) U.S. Cl.
CPC ............... *H04W 36/0027* (2013.01); *H04W 92/20* (2013.01)
USPC .......................................... 455/438; 455/436

(58) Field of Classification Search
USPC .......................... 455/436–438; 370/328, 331
See application file for complete search history.

(56) References Cited

U.S. PATENT DOCUMENTS

2010/0210268 A1*  8/2010  Lim et al. ...................... 455/436
2012/0218972 A1*  8/2012  Ohta ............................. 370/331

FOREIGN PATENT DOCUMENTS

| CN | 101616425 | 12/2009 |
| CN | 101674586 | 3/2010 |
| CN | 101790212 | 7/2010 |

* cited by examiner

*Primary Examiner* — Sam Bhattacharya
(74) *Attorney, Agent, or Firm* — Christopher L. Parmelee; Walker & Jocke

(57) ABSTRACT

The present invention discloses processing methods and processing systems for multi-carrier handover, wherein one of the processing methods comprises: a source base station, determining, according to a obtained supported-carrier-aggregation relationship among cells in an adjacent base station, a target Primary Cell (Pcell) and target Secondary Cell (Scell) (s), and notifying a target base station to which the target Pcell and the target Scell (s) belong; the target base station configuring the target Pcell, the target Scell (s) and a corresponding handover command, and sending the handover command to the source base station; and the source base station forwarding the handover command to a user equipment which, according to the handover command, accomplishes a handover process. The present invention achieves the handover in the multi-carrier system.

20 Claims, 4 Drawing Sheets

PROCESSING METHOD AND SYSTEM FOR MULTI-CARRIER HANDOVER

TECHNICAL FIELD OF THE INVENTION

The present invention relates to the field of communications, and in particular to a processing method and a processing system for multi-carrier handover.

BACKGROUND OF THE INVENTION

FIG. 1 shows a structural schematic diagram of an Evolved Universal Mobile Telecommunication System Radio Access Network (E-UTRAN for short) of the Long Term Evolution (LTE for short) system according to the prior art. As shown in FIG. 1, the LTE consists of the E-UTRAN and an Evolved Packet Core (EPC for short), with the network having a flat structure. The E-UTRAN is connected with the EPC via an S1 interface, wherein the E-UTRAN consists of a plurality of Evolved NodeBs (eNB for short) which are connected to each other via the X2 interface; and the EPC consists of a Mobility Management Entity (MME for short) and a Serving Gateway Entity (S-GW for short).

In the LET network system, when User Equipment (UE for short) moves in the network coverage area, such movement might cause variation of the serving cell of the UE. In order to keep the service continuity of the UE, it is required that the network assists the UE to handover among individual cells, wherein an initialization side of the handover is called a source side while a destination side of the handover is called a target side.

To satisfy the demand of on higher bandwidth, the LTE-Advanced (LTE-A for short) proposes a method of carrier aggregation to achieve higher bandwidth, in which a UE can operate at a plurality of continuous or discontinuous carries (each carrier is called a Component Carrier, that is, CC for short). Among the CCs, there is one Primary Component Carrier (PCC for short), while the others are Secondary Component Carriers (SCC for short). For each CC, there is a serving cell providing service for the UE, wherein the serving cell on the PCC is called a Primary Cell (Pcell for short), while the serving cell on the SCC is called a Secondary Cell (Scell for short). Radio resource of the LTE-A can be assigned to more than one carrier, that is, at least one Pcell and zero to several Scells.

In a LTE-A multi-carrier system in the prior art, when a plurality of cells can be treated as the target cell, a source base station can not determine which cell should be used as the target cell of the handover, therefore the handover can not be achieved.

SUMMARY OF THE INVENTION

One aspect of the present invention is to provide a processing method and a processing system for multi-carrier handover, to at least solve the mentioned above problem.

According to one aspect of the present invention, a processing method for multi-carrier handover is provided, which comprises: a source base station determining, according to an obtained supported-carrier-aggregation relationship among cells in adjacent base stations, a target Primary Cell (Pcell) and target Secondary Cell (Scell) (s); and notifying a target base station to which the target Pcell and the target Scell (s) belong; the target base station configuring the target Pcell, the target Scell (s) and a corresponding handover command, and sending the handover command to the source base station; and the source base station forwarding the handover command to a user equipment which, according to the handover command, accomplishes a handover process.

Further, the step of the source base station obtaining the supported-carrier-aggregation relationship comprises: the source base station obtaining the supported-carrier-aggregation relationship through Operation, Administration and Maintenance (OAM for short) configurations or an information interaction with an X2 interface.

Further, the step of the user equipment accomplishing the handover process according to the handover command comprises: the user equipment performing a random access according to the target Pcell indicated in the handover command.

Further, in this method, the step of the source base station notifying the target base station comprises: the source base station notifying the target base station through a handover request message during X2 handover; and the step of the target base station sending the handover command to the source base station comprises: the target base station directly sending the handover command to the source base station during X2 handover.

Further, in the method, the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

According to one aspect of the present invention, another processing method for multi-carrier handover is provided, which comprises: a source base station determining a target Pcell and candidate target Scell (s), and notifying a target base station to which the target Pcell and the candidate target Scell (s) belong; the target base station configuring the target Pcell, selecting target Scell (s) according to a Radio Resource Manage algorithm and information of the candidate target Scell (s), and configuring the target Scell (s); the target base station configuring a corresponding handover command according to the target Pcell and the target Scell (s), and sending the handover command to the source base station; and the source base station forwarding the handover command to a user equipment which, according to the handover command, accomplishes the handover process.

Further, the step of the target base station selecting the target Scell (s) according to the Radio Resource Manage algorithm and the information of the candidate target Scell (s) comprises: the target base station selecting a cell to be the target Scell (s), based on the Radio Resource Manage algorithm, local aggregation information and the information of the candidate target Scell (s), wherein the selected cell can be carrier-aggregated with the target Pcell.

Further, the step of the user equipment accomplishing the handover process according to the handover command comprises: the user equipment performing a random access according to the target Pcell indicated in the handover command.

Further, in the method, the step of the source base station notifying the target base station comprises: the source base station notifying the target base station through a handover request message during X2 handover; and the step of the target base station sending the handover command to the source base station comprises: the target base station directly sending the handover command to the source base station during X2 handover.

Further, in the method, the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

According to one aspect of the present invention, another processing method for multi-carrier handover is also provided, which comprises: a source base station determining a candidate target Pcell and candidate target Scell (s), and notifying a target base station to which the candidate target Pcell and the candidate target Scell (s) belong; the target base station selecting a target Pcell and target Scell (s) according to information of the candidate target Pcell and the candidate target Scell (s); the target base station configuring the target Pcell, the target Scell (s) and a corresponding handover command, and sending the handover command to the source base station; and the source base station forwarding the handover command to a user equipment which, according to the handover command, accomplishes the handover process.

Further, the step of the target base station selecting the target Pcell and the target Scell (s) according to the information of the candidate target Pcell and the candidate target Scell (s) comprises: the target base station, according to a Radio Resource Manage algorithm, resource in the local, load information, aggregation information in the local and the information of the candidate target Pcell and the candidate target Scell (s), selecting the target Pcell and the target Scell (s) which can be carrier-aggregated.

Further, the step of the user equipment accomplishing the handover process according to the handover command comprises: the user equipment performing a random access according to the target Pcell indicated in the handover command.

Further, in the method, the step of the source base station notifying the target base station comprises: the source base station notifying the target base station through a handover request message during X2 handover; and the step of the target base station sending the handover command to the source base station comprises: the target base station directly sending the handover command to the source base station during X2 handover.

Further, in the method, the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

According to one aspect of the present invention, a processing system for multi-carrier handover is provided, which comprises a source base station, a target base station and a user equipment, wherein the source base station comprises: a first determination module, adapted to, according to a obtained supported-carrier-aggregation relationship among cells in an adjacent base station, determine a target Primary Cell (Pcell) and a target Secondary Cell (Scell) (s); a first notification module, adapted to notify the determined result determined by the first determination module to the target base station to which the target Pcell and the target Scell (s) belong; a first receiving module, adapted to receive a handover command from the target base station; and a first forwarding module, adapted to forward the handover command to the user equipment, the target base station comprises: a fourth receiving module, adapted to receive the determined result from the first notification module; a first configuration module, adapted to configure the target Pcell, the target Scell (s) and a corresponding handover command; and a first sending module, adapted to send the handover command to the source base station, and the user equipment comprises: a fifth receiving module, adapted to receive the handover command from the first forwarding module; and a first handover module, adapted to accomplish a handover process according to the handover command.

According to one aspect of the present invention, another processing system for multi-carrier handover is also provided, which comprises a source base station, a target base station and a user equipment, wherein the source base station comprises: a second determination module, adapted to determine a target Pcell and candidate target Scell (s); a second notification module, adapted to notify the determined result determined by the second determination module to the target base station to which the target Pcell and the candidate target Scell (s) belong; a second receiving module, adapted to receive a handover command from the target base station; and a second forwarding module, adapted to forward the handover command to the user equipment, the target base station comprises: a sixth receiving module, adapted to receive the determined result from the second notification module; a second selecting module, adapted to select target Scell (s) according to a Radio Resource Manage algorithm and information of the candidate target Scell (s); a second configuration module, adapted to configure the target Pcell, the target Scell (s) and a corresponding handover command; and a second sending module, adapted to send the handover command to the source base station, and the user equipment comprises: a seventh receiving module, adapted to receive the handover command from the second forwarding module; and a second handover module, adapted to accomplish a handover process according to the handover command.

According to one aspect of the present invention, another processing system for multi-carrier handover is also provided, which comprises a source base station, a target base station and a user equipment, wherein the source base station comprises: a third determination module, adapted to determine a candidate target Pcell and candidate target Scell (s); a third notification module, adapted to notify the determined result determined by the third determination module to the target base station to which the candidate target Pcell and the candidate target Scell (s) belong; a third receiving module, adapted to receive a handover command from the target base station; and a third forwarding module, adapted to forward the handover command to the user equipment, the target base station comprises: an eighth receiving module, adapted to receive the determined result from the third notification module; a third selecting module, adapted to select a target Pcell and target Scell (s) according to a Radio Resource Manage algorithm and information of the candidate target Pcell and the candidate target Scell (s); a third configuration module, adapted to configure the target Pcell, the target Scell (s) and a corresponding handover command; and a third sending module, adapted to send the handover command to the source base station, and the user equipment comprises: a ninth receiving module, adapted to receive the handover command from the third forwarding module; and a third handover module, adapted to accomplish a handover process according to the handover command.

The present invention provides a method that a source base station or a target base station determines a Pcell and a Scell (s). Thus, the present invention solves the problem that a handover can not be achieved because a source base station can not determine which cell should be used as a target cell of the handover in a LTE-A multi-carrier system, and thereby achieves handover in a multi-carrier system.

BRIEF DESCRIPTION OF THE DRAWINGS

The herein described drawings are provided for further understanding of the present invention, and form a part of the present application. The exemplary embodiments of the present invention and the description thereof are provided to explain the present invention, and does not constitute undue limitation of the present invention. In the drawings.

DETAILED DESCRIPTION OF EMBODIMENTS

The present invention will be described in detail by reference to the drawings in combination with the embodiments hereinafter. It should be noted that the embodiments and the characteristics of the embodiments can be combined with each other if no conflict is resulted.

The handover process of a LTE-A multi-carrier system mainly comprises: a source base station, a target base station and a user equipment. In the handover process, during X2 handover, base stations communicate with each other via an X2 interface directly; during S1 handover, the base stations communicate with each other via an MME.

Embodiment 1

Figure 1:
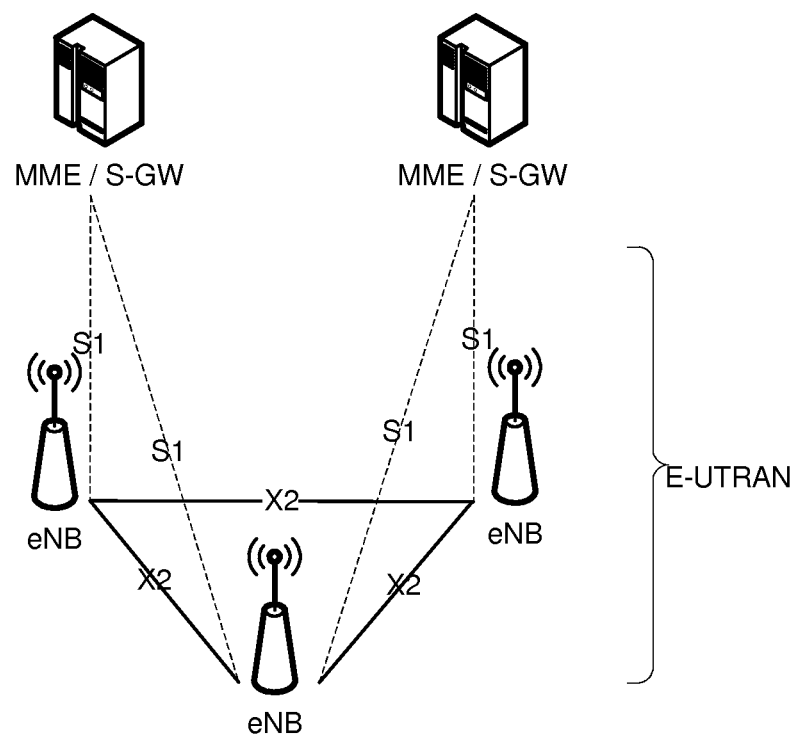
FIG. 1 is a structural schematic diagram of the E-UTRAN of a LTE system according to the prior art.
Figure 2:
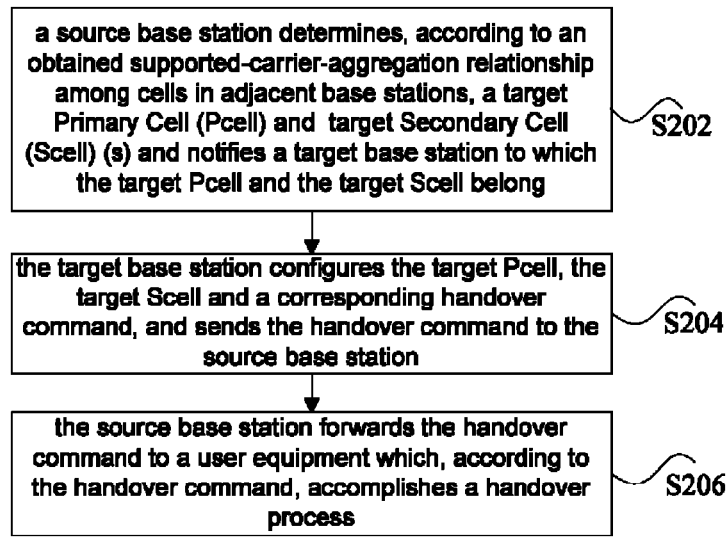
FIG. 2 is a flowchart of a first processing method for multi-carrier handover according to an embodiment of the present invention.

A processing method for multi-carrier handover is provided according to an embodiment of the present invention. FIG. 2 is a flowchart of a first processing method for multi-carrier handover according to the embodiment of the present invention. As shown in FIG. 2, the method comprises the following steps.

Step S202, a source base station determines, according to a obtained supported-carrier-aggregation relationship among cells in an adjacent base station, a target Primary Cell (Pcell) and target Secondary Cell (Scell) (s) and notifies a target base station to which the target Pcell and the target Scell (s) belong.

Step S204, the target base station configures the target Pcell, the target Scell (s) and a corresponding handover command, and sends the handover command to the source base station.

Step S206, the source base station forwards the handover command to a user equipment which, according to the handover command, accomplishes a handover process.

In the prior art, a handover can not be achieved in the LTE-A multi-carrier system because the source base station can not determine which cell should be used as the target cell of the handover. In this embodiment, the source base station determines the target Pcell and the target Scell (s) and achieves the handover process. Specifically, the source base station can learn which cells in the target base station can be carrier-aggregated, such as the adjacent cell NCell1 of the cell CC1, the adjacent cell NCell2 of the cell CC2 and the adjacent cell NCell3 of the cell CC3; and the source base station can learn that the NCell1, NCell2 and NCell3 belong to the same base station through configuration or automatic adjacent management function. Then the source base station determines, according to the obtained supported-carrier-aggregation relationship, whether two or more cells of the NCell1, NCell2 and NCell3 can be carrier-aggregated. In this way, the source base station can learn load and resource information of a plurality of cells in the target base station when making the handover decision. Therefore, the source base station can select several cells in the target base station as the target cells of the UE handover, thereby achieves the handover in a multi-carrier system.

Preferably, in step S202, the source base station obtains the supported-carrier-aggregation relationship through Operation, Administration and Maintenance (OAM for short) configurations or an information interaction via X2 interface. With this preferred embodiment, the source base station can obtain the supported-carrier-aggregation relationship by a pre-configuration manner or a self-configuration manner.

Preferably, in step S206, the user equipment performs a random access according to the target Pcell indicated in the handover command. Thereafter, the user equipment transmits data with the target Pcell and the target Scell (s).

Further, in step S202, the source base station notifies the target base station through a handover request message during X2 handover; in the step S204, the target base station directly sends the handover command to the source base station during X2 handover. With this preferred embodiment, the X2 handover in a multi-carrier system can be achieved.

Further, in step S202, the source base station notifies the target base station through a handover request message via a Mobility Management Entity during S1 handover; in step S204, the target base station sends the handover command to the source base station via the Mobility Management Entity during S1 handover. With this preferred embodiment, the S1 handover in a multi-carrier system is achieved.

The implementation process of said embodiment will be described in detail hereinafter.

Suppose that a LTE-A UE performs a three carrier aggregation of CC1, CC2 and CC3 in the cells of a source base station S-eNB, wherein a cell Cell1-1 on the CC1 is a primary cell, a cell Cell2-1 on the CC2 is a secondary cell, and a cell Cell3-1 on the CC3 is a secondary cell. The S-eNB has an adjacent base station T-eNB which supports four frequencies including the CC1, the CC2, the CC3 and a CC4, wherein the CC1 has a cell Cell1-2 thereon, the CC2 has a cell Cell2-2 thereon, the CC3 has a cell Cell3-2 thereon and the CC4 has a cell Cell4-2 thereon. And the Cell1-1, Cell2-1, Cell3-1 are adjacent cells corresponding to the Cell1-2, the Cell2-2, the Cell3-2 and the Cell4-2, that is, handover can be performed between any cells in the two base stations on a single carrier, wherein the Cell1-2, the Cell2-2 and the Cell4-2 in the T-eNB can perform carrier aggregation, and the Cell3-2 is a single-carrier cell.

The source base station obtains the supported-carrier-aggregation relationship among cells in the adjacent base stations through OAM configurations or information interaction via the X2 interface. The handover steps include that: the source base station determines a target Pcell and target Scell (s), and notifies the target base station during S1 or X2 handover; the target base station prepares handover according to the Pcell and the Scell (s) determined by the source base station, and configures a corresponding handover command; the source base station sends the handover command to a UE which performs a random access according to the target Pcell indicated in the handover command, and then accomplishes a handover.

A premise of the present embodiment is that the source base station is required to learn the available aggregate relationship among the adjacent cells in the adjacent base station before the handover. In a LTE system, a source base station can obtain adjacent cells of adjacent base stations by a pre-configuration manner (such as the manner of OAM) or a self-configuration manner (such as X2 information). Therefore, in the LTE-A system, the aggregation relationship can be configured by a pre-configuration manner or a self-configuration manner.

Taking the self-configuration manner as an example, according to the self-configuration process in the prior art, adjacent relationship can be obtained through an X2 initial setup process, or an X2 update process. Neighbour information element is included in an X2 setup request message, an X2 setup response message and an eNB configuration update message, which also includes an E-UTRA Cell Global Identification (E-CGI for short), a Physical Cell Identification (PCI for short) and an E-UTRA Absolute Radio Frequency Channel Number (EARFCN for short) of an adjacent cell. Through the neighbour information element, two eNBs can learn each other's cell configuration and set each other as its own adjacent cell. On this basis, eNBs can update aggregation information in the neighbour information elements, put the cells which can be aggregated with itself into a group, and notify other base stations of such group information. In the present example, when X2 of the S-eNB and the T-eNB initially setups, the S-eNB sends an X2 setup request to the T-eNB, wherein the neighbour information therein includes information of the Cell1-1, the Cell2-1 and the Cell3-1, and it is indicated in the aggregation information therein that the Cell1-1, the Cell2-1 and the Cell3-1 can be aggregated mutually. After receiving the X2 setup request, the T-eNB saves it and sends an X2 setup response to the S-eNB, wherein the neighbour information therein includes information of the Cell1-2, the Cell2-2, the Cell3-2 and the Cell4-2, and it is indicated in the aggregation information therein that the Cell1-2, the Cell2-2, the Cell4-2 can be aggregated mutually, while the Cell3-2 can not be aggregated with other cells. When the aggregation relationship changes, the changer notifies the change to the adjacent base station through an eNB configuration update message.

After the S-eNB learns the aggregation information of the T-eNB, if the S-eNB reports that the adjacent cell Cell2-2 is better than the current Pcell, i.e. the Cell1-1, then the S-eNB will determine to perform a handover when a UE triggers handover, such as the UE triggers a measurement report A3 event. In such an event, if an X2 handover is performed, it is specified in a handover request message (Handover Request) that the Target Cell ID of the target cell is the Cell2-2. In the LTE-A, the T-eNB interprets the Target Cell ID as that the S-eNB requires the target Pcell to be the Cell2-2, and carries a KeNB* generated by parameters provided by the Cell2-2 and a Next hop Chaining Count (NCC for short) corresponding to the KeNB* in AS Security Information. The S-eNB will also specify that the target Scell (s) is the Cell1-2 and the Cell4-2 in the Handover Preparation Information carried in a RRC context in the AS Security Information. Generally, the S-eNB also selects target Scell (s) according to the measurement report of the UE to guarantee the normal usage after the handover. If an S1 handover is performed, the S-eNB fills the eNB ID of the T-eNB in the Target ID in a handover required message and carries a Source eNB to Target eNB Transparent Container in a Source to Target Transparent Container, wherein the Target Cell ID and the RRC container thereof has the same content as the Target Cell ID and the RRC context in the Handover Request of the X2 handover mentioned above. The MME will forward the "Source eNB to Target eNB Transparent Container" to the T-eNB through the Handover Request according to the Target ID.

When receiving the handover configurations of the S-eNB through the Handover Request of the X2 or the Handover Request of the S1, the T-eNB specifies the Cell2-2 as the target Pcell and two cells, the Cell1-2 and the Cell4-2, as the target Scells. The T-eNB prepares resource according to this carrier configurations, and configures a handover command of the Uu interface accordingly, wherein in the handover command, the UE handover is specified, and it is specified that the Cell2-2 is the target Pcell, and the Cell1-2 and the Cell4-2 are the target Scells, and the related configuration information of the carriers and reserving resource in the local are also specified. If the X2 handover is performed, the T-eNB carries the Handover Command through the information element "Target eNB To Source eNB Transparent Container" in the Handover Request Acknowledge. If the S1 handover is performed, the T-eNB sends a Handover Request Acknowledge to the MME by a Target to Source Transparent Container which carries the above information element "Target eNB to Source eNB Transparent Container", and the MME forwards the Handover Request Acknowledge to the S-eNB through the Handover Command. If an receiving failure occurs in the T-eNB, for example, the local resource of the Pcell or the Scell is limited, it needs to respond a failure response message. In case of the X2 handover, a Handover Preparation Failure is responded to the S-eNB. In case of the S1 handover, a Handover Failure is responded, and after receiving the response, the MME forwards a Handover Preparation Failure to the S-eNB. In order to avoid the handover failure resulted from the receiving failure of the Scell, so as to influence the final handover success rate (when a receiving failure rate of one carrier is p, and N carriers are handed over synchronously, the handover failure rate is N*p), the T-eNB can respond a partial success response when the Pcell receives successfully while the Scells receive unsuccessfully. For instance, in the present embodiment, when the Cell2-2 receives successfully, the Cell1-2 receives successfully, and the Cell4-2 receives unsuccessfully, the T-eNB configures a Handover Command according to the Cell2-2 as the Pcell and the Cell1-2 as the Scell, and reserves related resource, and responds a Handover Command to the S-eNB according to the above process. Furthermore, partial failure information can be indicated in the corresponding message, for example, in the present embodiment, it is indicated that the Cell4-2 receives unsuccessfully, which is not configured in the Handover Command.

The S-eNB receives the Handover Command sent from the T-eNB (or forwarded by the MME), and sends to a UE through a RRC Connection Reconfiguration command of an air interface. The UE, according to the target Pcell Cell2-2 specified in the message, initializes a random access on the Cell2-2. After success, the UE sends a "RRC Connection Reconfiguration Complete". The T-eNB, after receiving said message, releases the resource of the S-eNB, which is the same as the subsequent flow of the LTE.

Figure 3:
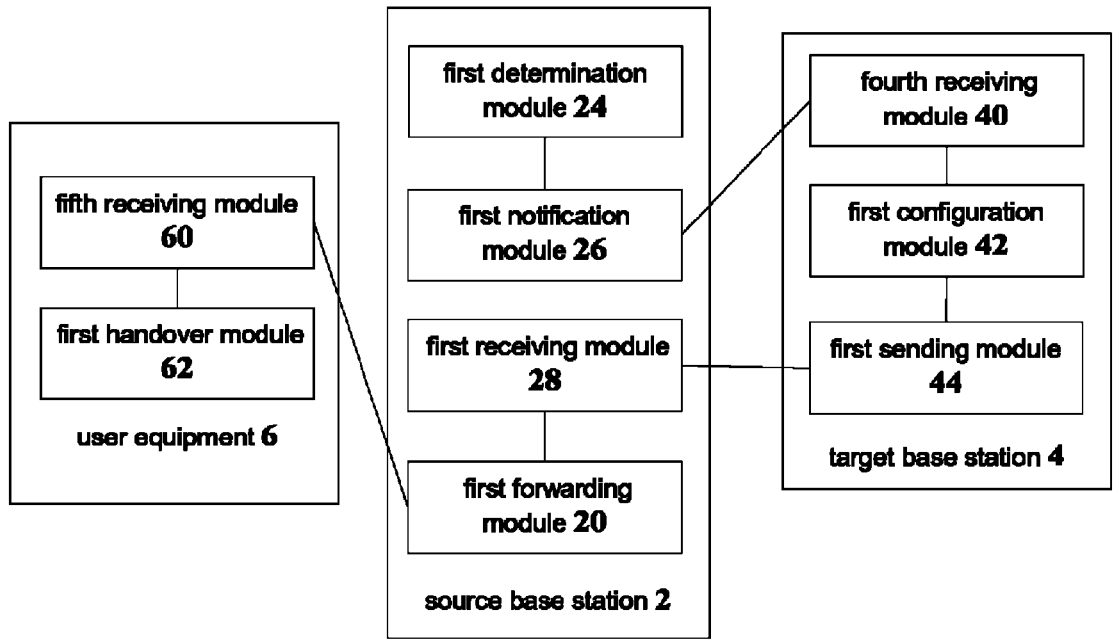
FIG. 3 is a structural block diagram of a first processing system for multi-carrier handover according to an embodiment of the present invention.

According to an embodiment of the present invention, a processing system for multi-carrier handover is provided. FIG. 3 is a structural block diagram of a first processing system for multi-carrier handover according to an embodiment of the present invention. As shown in FIG. 3, the system comprises a source base station 2, a target base station 4 and a user equipment 6, wherein:

the source base station 2 comprises: a first determination module 24, which is adapted to, according to a obtained supported-carrier-aggregation relationship, determine a target Primary Cell (Pcell) and target Secondary Cell (Scell) (s); a first notification module 26, which is connected with the first determination module 24 and adapted to notify the determined result determined by the first determination module 24 to the target base station to which the target Pcell and the target Scell (s) belong; a first receiving module 28, which is adapted to receive a handover command from the target base station; and a first forwarding module 20, which is connected with the first receiving module 28 and adapted to forward the handover command to the user equipment;

the target base station 4 comprises: a fourth receiving module 40, which is connected with the first notification module 26 and adapted to receive the determined result from the first notification module 26; a first configuration module 42, which is connected with the fourth receiving module 40 and adapted to configure the target Pcell, the target Scell (s) and a corresponding handover command; and a first sending module 44, which is connected with the first configuration module 42 and the first receiving module 28, and adapted to send the handover command to the source base station; and the user equipment 6 comprises: a fifth receiving module 60, which is connected with the first forwarding module 20 and adapted to receive the handover command from the first forwarding module 20; and a first handover module 62, which is connected with the fifth receiving module 60 and adapted to accomplish a handover process according to the handover command.

In the prior art, a handover can not be achieved in a LTE-A multi-carrier system because the source base station can not determine which cell should be used as the target cell of the handover. With this embodiment, the source base station determines the target Pcell and the target Scell (s) and achieves the handover process, the source base station can learn which cells in the target base station can be carrier-aggregated, and exactly learn load and resource information of a plurality of cells in the target base station when making the handover decision. Therefore, the source base station can specify several cells in the target base station as the target cells of the UE handover, thereby achieving the handover in a multi-carrier system.

Preferably, the first handover module 62 performs a random access according to the target Pcell indicated in the handover command; thereafter, the user equipment performs data transmission with the target Pcell and the target Scell (s).

Preferably, a first acquiring module 22 obtains the supported-carrier-aggregation relationship through OAM configurations or an information interaction with an X2 interface. With the preferred embodiment, the source base station can obtain the supported-carrier-aggregation relationship by a pre-configuration manner or a self-configuration manner.

Further, the first notification module 26 notifies the target base station through a handover request message during X2 handover; the first sending module 44 directly sends the handover command to the source base station during X2 handover. With the preferred embodiment, an X2 handover process of the multi-carrier system can be achieved.

Further, the first notification module 26 notifies the target base station through a handover request message via a Mobility Management Entity during S1 handover; the first sending module 44 sends the handover command to the source base station via the Mobility Management Entity during S1 handover. With the preferred embodiment, an S1 handover process of the multi-carrier system can be achieved.

Embodiment 2

Figure 4:
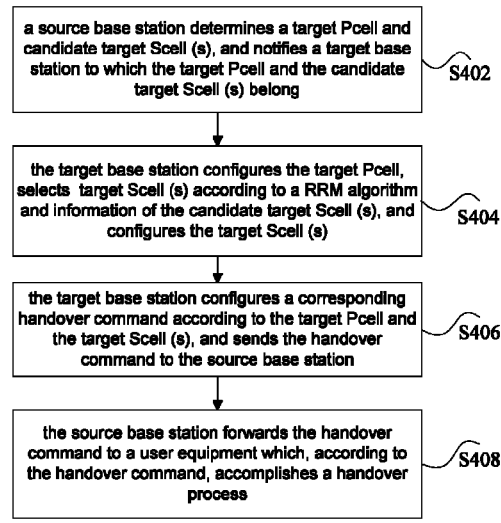
FIG. 4 is a flowchart of a second processing method for multi-carrier handover according to an embodiment of the present invention.

According to an embodiment of the present invention, a processing method for multi-carrier handover is provided. FIG. 4 is a flowchart of a second processing method for multi-carrier handover according to an embodiment of the present invention. As shown in FIG. 4, the method comprises the following steps.

Step S402, a source base station determines a target Pcell and a candidate target Scell (s), and notifies a target base station to which the target Pcell and the candidate target Scell (s) belong.

Step S404, the target base station configures the target Pcell, selects target Scell (s) according to a Radio Resource Manage (RRM for short) algorithm and information of the candidate target Scell (s), and configures the target Scell (s).

Step S406, the target base station configures a corresponding handover command according to the target Pcell and the target Scell (s), and sends the handover command to the source base station.

Step S408, the source base station forwards the handover command to a user equipment which, according to the handover command, accomplishes a handover process.

In the prior art, a handover can not be achieved in a LTE-A multi-carrier system because the source base station can not determine which cell should be used as the target cell of the handover. With this embodiment, the source base station determines the target Pcell, and the target base station determines the target Scell (s), thereby achieving the handover in a multi-carrier system.

Preferably, in step S404, the target base station, according to the RRM algorithm, aggregation information in the local and the information of the candidate target Scell (s), selects as the target Scell a cell which can be carrier-aggregated with the target Pcell.

Preferably, in step S408, the user equipment performs a random access according to the target Pcell indicated in the handover command; thereafter, the user equipment performs data transmission with the target Pcell and the target Scell (s).

Preferably, in step S402, the source base station notifies the target base station through a handover request message during X2 handover; in the step S406, the target base station directly sends the handover command to the source base station during X2 handover. With the preferred embodiment, an X2 handover process in the multi-carrier system can be achieved.

Preferably, in step S402, the source base station notifies the target base station through a handover request message via a Mobility Management Entity during S1 handover; in step S406, the target base station sends the handover command to the source base station via the Mobility Management Entity during S1 handover. With the preferred embodiment, an S1 handover process in the multi-carrier system can be achieved.

The implementation process of the present embodiment will be described in detail hereinafter. In this embodiment, the configurations of the source base station and the target base station are the same as the Embodiment 1, which will not be repeated herein.

The difference between Embodiment 2 and Embodiment 1 is that: if the Aggregation Information of the adjacent base stations can not be obtained by the S-eNB through the pre-configuration manner or the self-configuration manner, only the base station itself knows its own Aggregation Information. Therefore, the handover steps include that: the source base station determines the target Pcell, and notifies the target Pcell and other possible target cells (possible Scell) to the target base station through an S1/X2 handover process; the target base station prepares resource according to the Pcell determined by the source base station, and selects, from the other possible target cells transmitted by the source base station, a proper Scell which can be carrier-aggregated with the Pcell; the target base station configures the corresponding handover command according to the final PCell and Scell; the source base station sends the handover command to the UE which performs a random access according to the target Pcell indicated in the handover command and accomplishes the handover.

Since the S-eNB dose not know the Aggregation Information of the T-eNB, when the UE triggers the handover, such as the UE triggers a measurement report A3 event, and suppose that the S-eNB reports that the adjacent cell Cell2-2 is better than the current Pcell, i.e. the Cell1-1. In this situation, the S-eNB can determine that the target Pcell is the Cell2-2, but cannot determine which cells of the Cell1-2, the Cell3-2 and the Cell4-2 can be carrier-aggregated with the Cell2-2. The S-eNB determines to perform a handover, wherein if an X2 handover is performed, it is specified in a handover request message that the Target Cell ID of the target cell is the Cell2-2. In the LTE-A, the T-eNB interprets the Target Cell ID as that the S-eNB requires the target Pcell to be the Cell2-2, and carries a KeNB* generated by parameters provided by the Cell2-2 and a Next hop Chaining Count (NCC for short) corresponding to the KeNB* in AS Security Information. The S-eNB will also specify that the possible target Scell is the Cell1-2, the Cell3-2 and the Cell4-2 in Handover Preparation Information carried in a RRC context in the AS Security Information. If the UE also previously reported a measurement report that the signals of the Cell1-2, the Cell3-2 and the Cell4-2 become better, the S-eNB can select a possible target Scell according to the measurement report of the UE to guarantee that the T-eNB can select target Scell (s) from the cells receivable by the UE. If an S1 handover is performed, similar to the Embodiment 1, the S-eNB fills the eNB ID of the T-eNB in the Target ID in a handover required message and carries a Source eNB to Target eNB Transparent Container in a Source to Target Transparent Container, wherein the Target Cell ID and the RRC container thereof has the same content as the Target Cell ID and the RRC context in the Handover Request of the X2 handover mentioned above. The MME will forward the Source eNB to Target eNB Transparent Container to the T-eNB through the Handover Request according to the Target ID.

When receiving the handover configurations of the S-eNB through the Handover Request of the X2 or the Handover Request of the S1, the T-eNB specifies the Cell2-2 as the target Pcell and specifies three cells including the Cell1-2, the Cell3-2 and the Cell4-2 as the possible target Scells. The T-eNB searches a cell which can be carrier-aggregated with the Pcell Cell1-2 required by the S-eNB according to its own Aggregation Information. In the present embodiment, the Cell1-2 and the Cell4-2 can be carrier-aggregated with the Cell2-2. The T-eNB prepares the corresponding resource according to the Pcell Cell2-2 specified by the S-eNB and the Scell Cell1-2 and the Scell Cell4-2 selected by itself as the carrier configurations, and configures a handover command of the Uu interface accordingly. It is specified in the handover command that the UE requires a handover, and that the Cell2-2 is the target Pcell, and the Cell1-2 and the Cell4-2 are the target Scells. The related configuration information of the carriers is also specified in the handover command. If the X2 handover is performed, the T-eNB carries the Handover Command through the information element "Target eNB To Source eNB Transparent Container" in the Handover Request Acknowledge. If the S1 handover is performed, the T-eNB sends a Handover Request Acknowledge to the MME by a "Target to Source Transparent Container" which carries the above information element "Target eNB to Source eNB Transparent Container", and the MME forwards the Handover Request Acknowledge to the S-eNB through the Handover Command. If an receiving failure occurs in the T-eNB, for example, the local resource of the Pcell is limited, it needs to respond a failure response message. In the case of the X2 handover, a Handover Preparation Failure is responded to the S-eNB. While in the case of the S1 handover a Handover Failure is responded, and after receiving the response, the MME forwards a Handover Preparation Failure to the S-eNB.

The S-eNB receives the Handover Command sent from the T-eNB (or forwarded by the MME), and sends the Handover Command to the UE through a RRC Connection Reconfiguration command of an air interface. The UE, according to the target Pcell Cell2-2 specified in the message, initializes a random access on the Cell2-2. After success, the UE sends a "RRC Connection Reconfiguration Complete" message to the T-eNB. The T-eNB, after receiving said message, releases the resource of the S-eNB, which is the same as the subsequent flow of the LTE.

Figure 5:
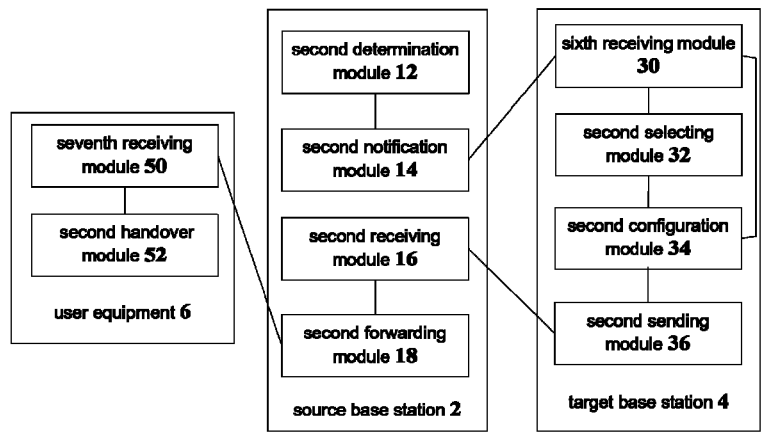
FIG. 5 is a structural block diagram of a second processing system for multi-carrier handover according to an embodiment of the present invention.

According to an embodiment of the present invention, a processing system for multi-carrier handover is provided. FIG. 5 is a structural block diagram of a second processing system for multi-carrier handover according to an embodiment of the present invention. As shown in FIG. 5, the system comprises a source base station 2, a target base station 4 and a user equipment 6, wherein:

the source base station 2 comprises: a second determination module 12, which is adapted to determine a target Pcell and candidate target Scell (s); a second notification module 14, which is connected with the second determination module 12 and adapted to notify the determined result determined by the second determination module 12 to the target base station to which the target Pcell and the candidate target Scell (s) belong; a second receiving module 16, which is adapted to receive a handover command from the target base station; and a second forwarding module 18, which is connected with the second receiving module 16 and adapted to forward the handover command to the user equipment;

the target base station 4 comprises: a sixth receiving module 30, which is connected with the second notification module 14 and adapted to receive the determined result from the second notification module 14; a second selecting module 32, which is connected with the sixth receiving module 30 and adapted to select target Scell (s) according to a RRM algorithm and information of the candidate target Scell; a second configuration module 34, which is connected with the sixth receiving module 30 and the second selecting module 32, and adapted to configure the target Pcell, the target Scell (s) and a corresponding handover command; and a second sending module 36, which is connected with the second configuration module 34 and adapted to send the handover command to the source base station; and the user equipment 6 comprises: a seventh receiving module 50, which is connected with the second forwarding module 18 and adapted to receive the handover command from the second forwarding module 18; and a second handover module 52, which is connected with the seventh receiving module 50 and adapted to accomplish a handover process according to the handover command.

In the prior art, a handover can not be achieved in the LTE-A multi-carrier system because the source base station can not determine which cell should be used as the target cell of the handover. With this embodiment, the source base station determines the target Pcell, and the target base station determines the target Scell (s), thereby achieving the handover in a multi-carrier system.

Preferably, the second handover module 52 performs a random access according to the target Pcell indicated in the handover command; thereafter, the user equipment performs data transmission with the target Pcell and the target Scell (s).

Further, the second notification module 14 notifies the target base station through a handover request message during X2 handover; the second sending module 36 directly sends the handover command to the source base station during X2 handover. With the preferred embodiment, an X2 handover process in a multi-carrier system can be achieved.

Further, the second notification module 14 notifies the target base station through a handover request message via a Mobility Management Entity during S1 handover; the second sending module 36 sends the handover command to the source base station via the Mobility Management Entity during S1 handover. With the preferred embodiment, an S1 handover process in a multi-carrier system can be achieved.

Embodiment 3

Figure 6:
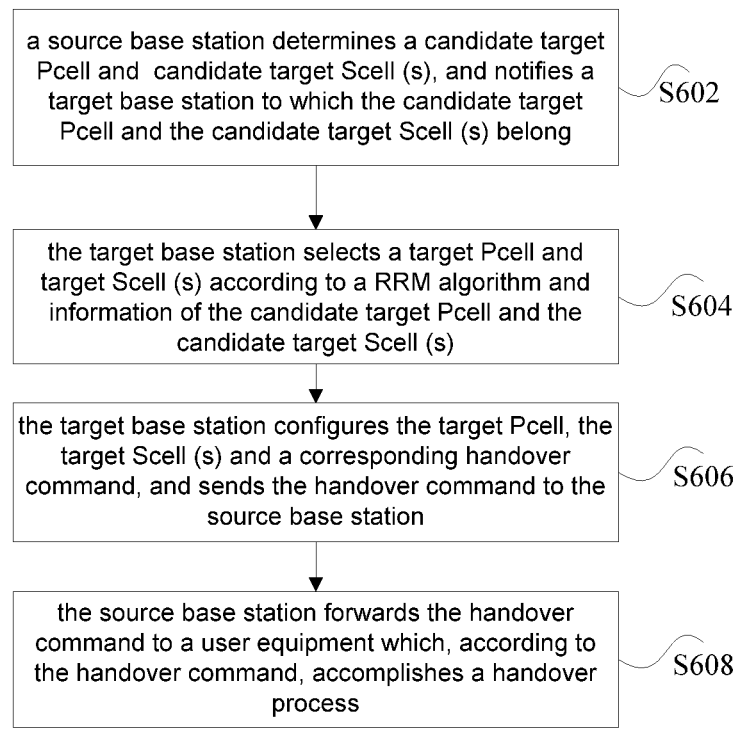
FIG. 6 is a flowchart of a third processing method for multi-carrier handover according to an embodiment of the present invention.

According to an embodiment of the present invention, a processing method for multi-carrier handover is provided. FIG. 6 is a flowchart of a third processing method for multi-carrier handover according to an embodiment of the present invention. As shown in FIG. 6, the method comprises the following steps.

Step S602, a source base station determines a candidate target Pcell and candidate target Scell (s), and notifies a target base station to which the candidate target Pcell and the candidate target Scell (s) belong.

Step S604, the target base station selects a target Pcell and target Scell (s) according to information of the candidate target Pcell and the candidate target Scell (s).

Step S606, the target base station configures the target Pcell, the target Scell (s) and a corresponding handover command, and sends the handover command to the source base station.

Step S608, the source base station forwards the handover command to a user equipment which, according to the handover command, accomplishes a handover process.

In the prior art, a handover can not be achieved in the LTE-A multi-carrier system because the source base station can not determine which cell should be used as the target cell of the handover. With this embodiment, the target base station determines the target Pcell and the target Scell (s), thereby achieving the handover of the multi-carrier system.

Preferably, in step S604, the target base station selects the target Pcell and the target Scell (s) that can be carrier-aggregated, according to the RRM algorithm, resource in the local, load information, aggregation information in the local and the information of the candidate target Pcell and the candidate target Scell (s).

Preferably, in step S608, the user equipment performs a random access according to the target Pcell indicated in the handover command; thereafter, the user equipment performs data transmission with the target Pcell and the target Scell (s).

Preferably, in step S602, the source base station notifies the target base station through a handover request message during X2 handover; in the step S606, the target base station directly sends the handover command to the source base station during X2 handover. With the preferred embodiment, an X2 handover process in a multi-carrier system can be achieved.

Preferably, in step S602, the source base station notifies the target base station through a handover request message via a Mobility Management Entity during S1 handover; in step S606, the target base station sends the handover command to the source base station via the Mobility Management Entity during S1 handover. With the preferred embodiment, an S1 handover process in a multi-carrier system can be achieved.

The implementation process of the present embodiment will be described in detail hereinafter. In the embodiment, the configurations of the source base station and the target base station are the same as the Embodiment 1; which will not be repeated herein.

Embodiment 3 is similar to Embodiment 2 as in that both of them works for the situation that the Aggregation Information of the adjacent base stations cannot be obtained by the S-eNB through the pre-configuration manner or the self-configuration manner, and that only the base station itself knows its own Aggregation Information. The difference between the Embodiment 3 and the Embodiment 2 is that: the target base station not only can select the target secondary cell but also can modify the primary cell required by the source base station according to its own resource and load condition. The handover steps include that: the source base station determines possible target Pcells, and notifies the target base station of the possible target Pcells and other possible target cells (possible Scells) through S1 or X2 handover process; the target base station selects proper Pcell and Scell (s) according to the information of the possible Pcells and Scells transmitted by the source base station, resource in the local, and load information; the target base station configures the corresponding handover command according to the final PCell and Scell; and the source base station sends the handover command to the UE which performs a random access according to the target Pcell indicated in the handover command and accomplishes the handover.

Since the S-eNB dose not know the Aggregation Information of the T-eNB, when the UE triggers the handover, such as the UE triggers a measurement report A3 event, suppose that the S-eNB reports that the adjacent cell Cell2-2 is better than the current Pcell, i.e. the Cell1-1. The S-eNB can determine that the target Pcell is the Cell2-2, but can not determine which cells of the Cell1-2, the Cell3-2 and the Cell4-2 can be carrier-aggregated with the Cell2-2. The S-eNB determines to perform a handover. If an X2 handover is performed, it is specified in a handover request message that the Target Cell ID of the target cell is the Cell2-2. In the LTE-A, the T-eNB interprets the Target Cell ID as that the S-eNB requires the target Pcell to be the Cell2-2, and carries a KeNB* generated by parameters provided by the Cell2-2 and a Next hop Chaining Count (NCC for short) corresponding to the KeNB* in AS Security Information. The S-eNB will also specify that the possible target Scell is the Cell1-2, the Cell3-2 and the Cell4-2 in Handover Preparation Information carried in a RRC context in the AS Security Information. Since these cells also can be selected as Pcells by the T-eNB, the S-eNB also carries the KeNB* generated by the parameters provided by the Cell1-2, the Cell3-2 and the Cell4-2, and a NCC corresponding to the KeNB* in the RRC context. If the UE also previously reported a measurement report that the signals of the Cell1-2, the Cell3-2 and the Cell4-2 become better, the S-eNB can select a possible target Scell, according to the measurement report of the UE to guarantee that the T-eNB can select target Scell (s) from the cells receivable by the UE. If an S1 handover is performed, similar to the first method, the S-eNB fills the eNB ID of the T-eNB in the Target ID in a handover required message and carries a Source eNB to Target eNB Transparent Container in a Source to Target Transparent Container, wherein the Target Cell ID and the RRC container thereof has the same content as the Target Cell ID and the RRC context in the Handover Request of the X2 handover mentioned above. The MME will forward the Source eNB to Target eNB Transparent Container to the T-eNB through the Handover Request according to the Target ID.

When receiving the handover configurations of the S-eNB through the Handover Request of the X2 or the Handover Request of the S1, the T-eNB specifies the Cell2-2 as the target Pcell and specifies three cells including the Cell1-2, the Cell3-2 and the Cell4-2 as the possible target Scells. The T-eNB can perform configurations based on the Pcell specified by the target base station according to its own resource, load and the Aggregation Information corresponding to each of the cells. This situation is similar to the subsequent process of the Embodiment 2, or it can be determined to modify the Pcell specified by the S-eNB, wherein the new Pcell is the Cell1-2 and only the Cell4-2 is configured as a Scell. The T-eNB prepares the corresponding resource by taking the Pcell Cell1-2 and the Scell Cell4-2 finally selected by the T-eNB as the carrier configurations, and configures a handover command of the Uu interface accordingly. It is specified in the handover command that the UE requires a handover, and that the Cell1-2 is the target Pcell and the Cell4-2 is the target Scell. The related configuration information of the two carriers is also specified in the handover command. If the X2 handover is performed, the T-eNB carries the Handover Command through the information element "Target eNB To Source eNB Transparent Container" in the Handover Request Acknowledge. If the S1 handover is performed, the T-eNB sends a Handover Request Acknowledge to the MME by a Target to Source Transparent Container which carries the above information element "Target eNB to Source eNB Transparent Container", and the MME forwards the Handover Request Acknowledge to the S-eNB through the Handover Command. If an receiving failure occurs in the T-eNB, for example, a proper Pcell or Scell can not be found because the resource is limited, it needs to respond a failure response message. In the case of the X2 handover, a Handover Preparation Failure is responded to the S-eNB. While in the case of the S1 handover, a Handover Failure is responded, and after receiving the response, the MME forwards a Handover Preparation Failure to the S-eNB.

The S-eNB receives the Handover Command of the Uu interface sent from the T-eNB (or forwarded by the MME), and sends to the UE through a RRC Connection Reconfiguration command of an air interface. The UE, according to the target Pcell Cell1-2 specified in the message, initializes a random access on the Cell1-2. After success, the UE sends a "RRC Connection Reconfiguration Complete" message to the T-eNB. The T-eNB, after receiving said message, releases the resource of the S-eNB, which is the same as the subsequent flow of the LTE.

According to an embodiment of the present invention, a processing system for multi-carrier handover is provided.

Figure 7:
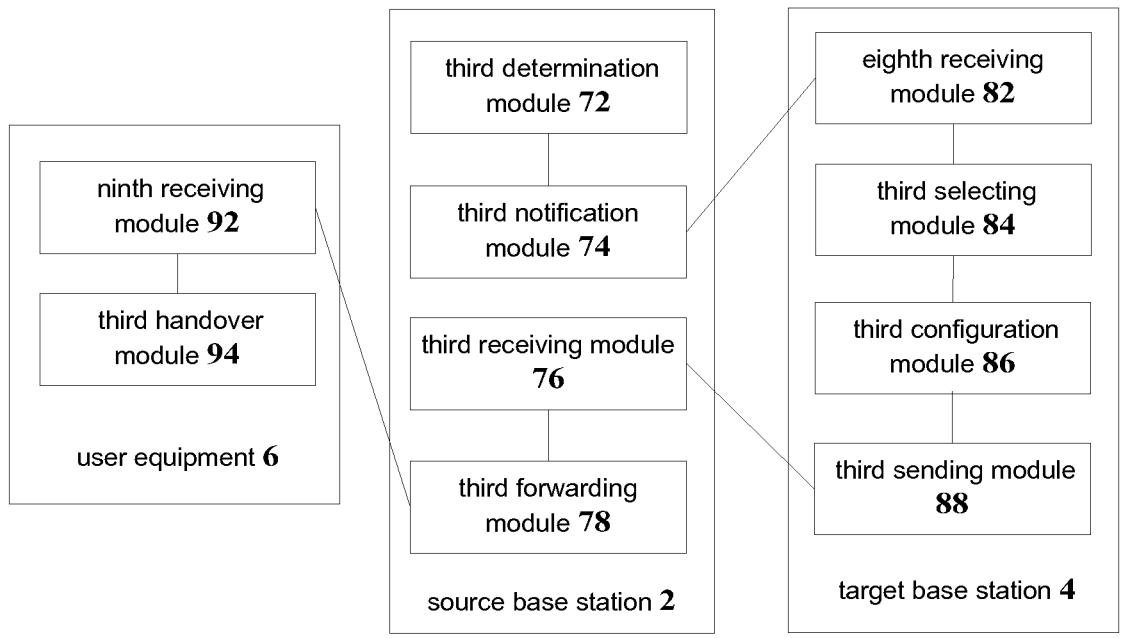
FIG. 7 is a structural block diagram of a third processing system for multi-carrier handover according to an embodiment of the present invention.

FIG. 7 is a structural block diagram of a third processing system for multi-carrier handover according to an embodiment of the present invention. As shown in FIG. 7, the system comprises a source base station 2, a target base station 4 and a user equipment 6, wherein:

the source base station 2 comprises: a third determination module 72, which is adapted to determine a candidate target Pcell and a candidate target Scell; a third notification module 74, which is connected with the third determination module 72 and adapted to notify the determined result determined by the third determination module to the target base station to which the candidate target Pcell and the candidate target Scell (s) belong; a third receiving module 76, which is adapted to receive a handover command from the target base station; and a third forwarding module 78, which is connected with the third receiving module 76 and adapted to forward the handover command to the user equipment;

the target base station 4 comprises: an eighth receiving module 82, which is connected with the third notification module 74 and adapted to receive the determined result from the third notification module 74; a third selecting module 84, which is connected with the eighth receiving module 82, and adapted to select a target Pcell and target Scell (s) according to resource in the local, load information and information of the candidate target Pcell and the candidate target Scell (s); a third configuration module 86, which is connected with the third selecting module 84 and adapted to configure the target Pcell, the target Scell (s) and a corresponding handover command; and a third sending module 88, which is connected with the third configuration module 86 and adapted to send the handover command to the source base station; and the user equipment 6 comprises: a ninth receiving module 92, which is connected with the third forwarding module 78 and adapted to receive the handover command from the third forwarding module 78; and a third handover module 94, which is connected with the ninth receiving module 92 and adapted to accomplish a handover process according to the handover command.

In the prior art, a handover can not be achieved in the LTE-A multi-carrier system because the source base station can not determine which cell should be used as the target cell of the handover. With this embodiment, the target base station determines the target Pcell and the target Scell (s), thereby achieving the handover in the multi-carrier system.

Preferably, the third selecting module 84, according to a RRM algorithm, the resource in the local, the load information, aggregation information in the local, and the information of the candidate target Pcell and Scell (s), selects the target Pcell and the target Scell (s) which can be carrier-aggregated.

Preferably, the third handover module 94 performs a random access according to the target Pcell indicated in the handover command; thereafter, the user equipment performs data transmission with the target Pcell and the target Scell (s).

Further, the third notification module 74 notifies the target base station through a handover request message during X2 handover; the third sending module 88 directly sends the handover command to the source base station during X2 handover. With the preferred embodiment, an X2 handover process in the multi-carrier system can be achieved.

Further, the third notification module 74 notifies the target base station through a handover request message via a Mobility Management Entity during S1 handover; the third sending module 88 sends the handover command to the source base station via the Mobility Management Entity during S1 handover. With the preferred embodiment, an S1 handover process in the multi-carrier system can be achieved.

To sum up, with the above embodiments of the present invention, the source base station determines the target Pcell and the target Scell (s), or the source base station determines the target Pcell and the target Scell (s), or the target base station determines the target Pcell and the target Scell (s). Therefore, the present invention can solve the problem that a handover can not be achieved in the LTE-A multi-carrier system because the source base station can not determine which cell should be used as the target cell of the handover, and thereby achieve the handover in the multi-carrier system.

Obviously, those skilled in the art should understand that each of the modules and each of the steps described above can be implemented by a common computing device, and they can be integrated on a single computing device or distributed on a network composed of a plurality of computing devices. Optionally, they can be implemented by a programming code executable by a computing device, thus they can be stored in a storage device to be executed by a computing device. And in some conditions, the steps shown or described above can be executed in a different order, or manufactured into individual integrated circuit module respectively, or a plurality of modules and steps therein can be manufactured into a single integrated circuit module. In this sense, the present invention is not limited to any combination of specific hardware and software.

The above is only the preferred embodiments of the present invention, and is not intended to limit the present invention. For those skilled in the art, various modifications and changes can be made to the present invention. Any modification, equivalent substitute and improvement within the basic idea and principle of the present invention are deemed to be included in the scope of the present invention.

What is claimed is:

1. A processing method for multi-carrier handover, comprising:
   a source base station determining, according to an obtained supported-carrier-aggregation relationship among cells in adjacent base stations, a target Primary Cell (Pcell) and target Secondary Cell (Scell) (s), and notifying a target base station to which the target Pcell and the target Scell(s) belong;
   the target base station configuring the target Pcell, the target Scell (s) and a corresponding handover command, and sending the handover command to the source base station; and
   the source base station forwarding the handover command to a user equipment which, according to the handover command, accomplishes a handover process.

2. The method according to claim 1, wherein the step of the source base station obtaining the supported carrier-aggregation relationship comprises:
   the source base station obtaining the supported-carrier-aggregation relationship through Operation, Administration and Maintenance (OAM) configurations or an information interaction via an X2 interface.

3. The method according to claim 1, wherein the step of the user equipment accomplishing the handover process according to the handover command comprises:
   the user equipment performing a random access according to the target Pcell indicated in the handover command.

4. The method according to claim 3, wherein,
   the step of the source base station notifying the target base station comprises: the source base station notifying the target base station through a handover request message during X2 handover; and the step of the target base station sending the handover command to the source base station comprises: the target base station directly sending the handover command to the source base station during X2 handover; or,
   the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

5. The method according to claim 1, wherein,
   the step of the source base station notifying the target base station comprises: the source base station notifying the target base station through a handover request message during X2 handover; and
   the step of the target base station sending the handover command to the source base station comprises: the target base station directly sending the handover command to the source base station during X2 handover or,
   the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

6. A processing method for multi-carrier handover, comprising:
   a source base station determining a target Primary Cell (Pcell) and candidate target Secondary Cell (Scell) (s), and notifying a target base station to which the target Pcell and the candidate target Scell (s) belong;
   the target base station configuring the target Pcell (s), selecting target Scell (s) according to information of the candidate target Scell (s), and configuring the target Scell;
   the target base station configuring a corresponding handover command according to the target Pcell and the target Scell, and sending the handover command to the source base station; and
   the source base station forwarding the handover command to a user equipment which, according to the handover command, accomplishes a handover process.

7. The method according to claim 6, wherein the step of the target base station selecting the target Scell according to the information of the candidate target Scell (s) comprises:
   the target base station, according to the RRM algorithm, aggregation information in the local and the information of the candidate target Scell (s), selecting as the target Scell (s) which can be carrier-aggregated with the target Pcell.

8. The method according to claim 7, wherein,
   the step of the source base station notifying the target base station comprises: the source base station notifying the target base station through a handover request message during X2 handover; and the step of the target base station sending the handover command to the source base station comprises: the target base station directly sending the handover command to the source base station during X2 handover; or,
   the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

9. The method according to claim 6, wherein the step of the user equipment accomplishing the handover process according to the handover command comprises:
the user equipment performing a random access according to the target Pcell indicated in the handover command.

10. The method according to claim 9, wherein,
the step of the source base station notifying the target base station comprises: the source base station notifying the target base station through a handover request message during X2 handover; and the step of the target base station sending the handover command to the source base station comprises: the target base station directly sending the handover command to the source base station during X2 handover; or,
the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

11. The method according to claim 6, wherein,
the step of the source base station notifying the target base station comprises: the source base station notifying the target base station through a handover request message during X2 handover; and
the step of the target base station sending the handover command to the source base station comprises: the target base station directly sending the handover command to the source base station during X2 handover or,
the step of the source base station notifying the target base station comprises: the source base station notifying the target base station through a handover request message via a Mobility Management Entity during S1 handover; and
the step of the target base station sending the handover command to the source base station comprises: the target base station sending the handover command to the source base station via the Mobility Management Entity during S1 handover.

12. A processing method for multi-carrier handover, comprising:
a source base station determining a candidate target Primary Cell (Pcell) and candidate target Secondary Cell (Scell) (s), and notifying a target base station to which the candidate target Pcell and the candidate target Scell (s) belong;
the target base station selecting a target Pcell and target Scell (s) according to information of the candidate target Pcell and the candidate target Scell (s);
the target base station configuring the target Pcell, the target Scell (s) and a corresponding handover command, and sending the handover command to the source base station; and
the source base station forwarding the handover command to a user equipment which, according to the handover command, accomplishes a handover process.

13. The method according to claim 12, wherein the step of the target base station selecting the target Pcell and the target Scell according to the information of the candidate target Pcell and the candidate target Scell (s) comprises:
the target base station, according to a Radio Resource Manage (RRM) algorithm, resource in the local, load information, aggregation information in the local and the information of the candidate target Pcell and the candidate target Scell (s), selecting the target Pcell and the target Scell (s) which can be carrier-aggregated.

14. The method according to claim 13, wherein,
the step of the source base station notifying the target base station comprises: the source base station notifying the target base station through a handover request message during X2 handover; and the step of the target base station sending the handover command to the source base station comprises: the target base station directly sending the handover command to the source base station during X2 handover; or,
the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

15. The method according to claim 12, wherein the step of the user equipment accomplishing the handover process according to the handover command comprises:
the user equipment performing a random access according to the target Pcell indicated in the handover command.

16. The method according to claim 15, wherein,
the step of the source base station notifying the target base station comprises: the source base station notifying the target base station through a handover request message during X2 handover; and the step of the target base station sending the handover command to the source base station comprises: the target base station directly sending the handover command to the source base station during X2 handover; or,
the step of the source base station notifying the target base station comprises: the source base station notifying the target base station through a handover request message via a Mobility Management Entity during S1 handover; and the step of the target base station sending the handover command to the source base station comprises: the target base station sending the handover command to the source base station via the Mobility Management Entity during S1 handover.

17. The method according to claim 12, wherein,
the step of the source base station notifying the target base station comprises: the source base station notifying the target base station through a handover request message during X2 handover; and
the step of the target base station sending the handover command to the source base station comprises: the target base station directly sending the handover command to the source base station during X2 handover; or,
the step of the source base station notifying the target base station comprises: the source base station notifying the target base station through a handover request message via a Mobility Management Entity during S1 handover; and
the step of the target base station sending the handover command to the source base station comprises: the target base station sending the handover command to the source base station via the Mobility Management Entity during S1 handover.

18. A processing system for multi-carrier handover, comprising a source base station, a target base station and a user equipment, wherein, the source base station comprises:
a first determination module, adapted to, according to a obtained supported-carrier-aggregation relationship among cells in an adjacent base station, determine a target Primary Cell (Pcell) and target Secondary Cell (Scell) (s);
a first notification module, adapted to notify the determined result determined by the first determination module to the target base station to which the target Pcell and the target Scell belong;
a first receiving module, adapted to receive a handover command from the target base station; and
a first forwarding module, adapted to forward the handover command to the user equipment, the target base station comprises:
a fourth receiving module, adapted to receive the determined result from the first notification module;
a first configuration module, adapted to configure the target Pcell, the target Scell and a corresponding handover command; and
a first sending module, adapted to send the handover command to the source base station, and the user equipment comprises:
a fifth receiving module, adapted to receive the handover command from the first forwarding module; and
a first handover module, adapted to accomplish a handover process according to the handover command.

19. A processing system for multi-carrier handover, comprising a source base station, a target base station and a user equipment, wherein, the source base station comprises:
a second determination module, adapted to determine a target Primary Cell (Pcell) and a candidate target Secondary Cell (Scell) (s);
a second notification module, adapted to notify the determined result determined by the second determination module to the target base station to which the target Pcell and the candidate target Scell belong;
a second receiving module, adapted to receive a handover command from the target base station; and
a second forwarding module, adapted to forward the handover command to the user equipment, the target base station comprises:
a sixth receiving module, adapted to receive the determined result from the second notification module;
a second selecting module, adapted to select target Scell (s) according to a Radio Resource Manage (RRM) algorithm and information of the candidate target Scell;
a second configuration module, adapted to configure the target Pcell, the target Scell and a corresponding handover command; and
a second sending module, adapted to send the handover command to the source base station, and the user equipment comprises:
a seventh receiving module, adapted to receive the handover command from the second forwarding module; and
a second handover module, adapted to accomplish a handover process according to the handover command.

20. A processing system for multi-carrier handover, comprising a source base station, a target base station and a user equipment, wherein, the source base station comprises:
a third determination module, adapted to determine a candidate target Primary Cell (Pcell) and a candidate target Secondary Cell (Scell) (s);
a third notification module, adapted to notify the determined result determined by the third determination module to the target base station to which the candidate target Pcell and the candidate target Scell belong;
a third receiving module, adapted to receive a handover command from the target base station; and
a third forwarding module, adapted to forward the handover command to the user equipment, the target base station comprises:
an eighth receiving module, adapted to receive the determined result from the third notification module;
a third selecting module, adapted to select a target Pcell and target Scell (s) according to a Radio Resource Manage (RRM) algorithm and information of the candidate target Pcell and the candidate target Scell;
a third configuration module, adapted to configure the target Pcell, the target Scell and a corresponding handover command; and
a third sending module, adapted to send the handover command to the source base station, and the user equipment comprises:
a ninth receiving module, adapted to receive the handover command from the third forwarding module; and
a third handover module, adapted to accomplish a handover process according to the handover command.

* * * * *